April 18, 1961 S. R. HOWARD 2,980,251
WEIGHING MACHINE
Filed Oct. 1, 1954 5 Sheets-Sheet 1

INVENTOR.
Stanley R. Howard
BY J. Stanley Churchill
ATTORNEY

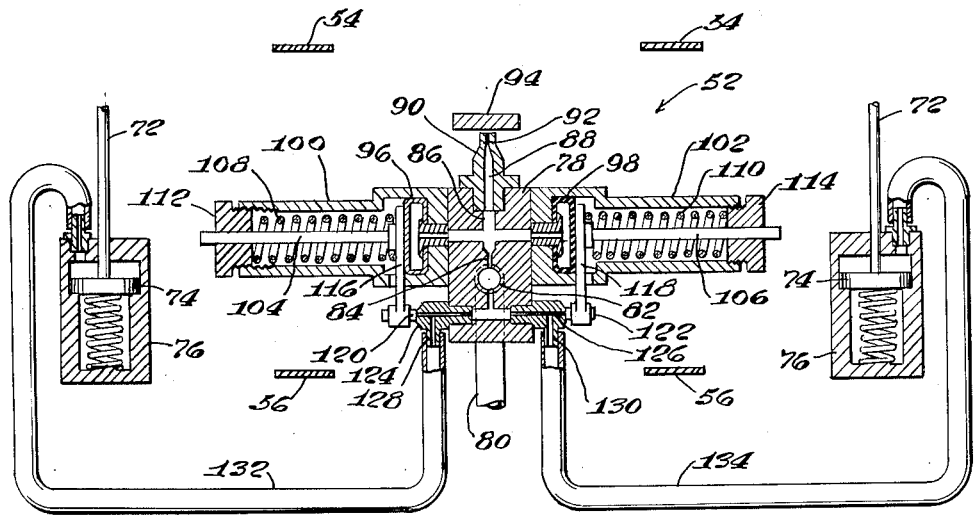
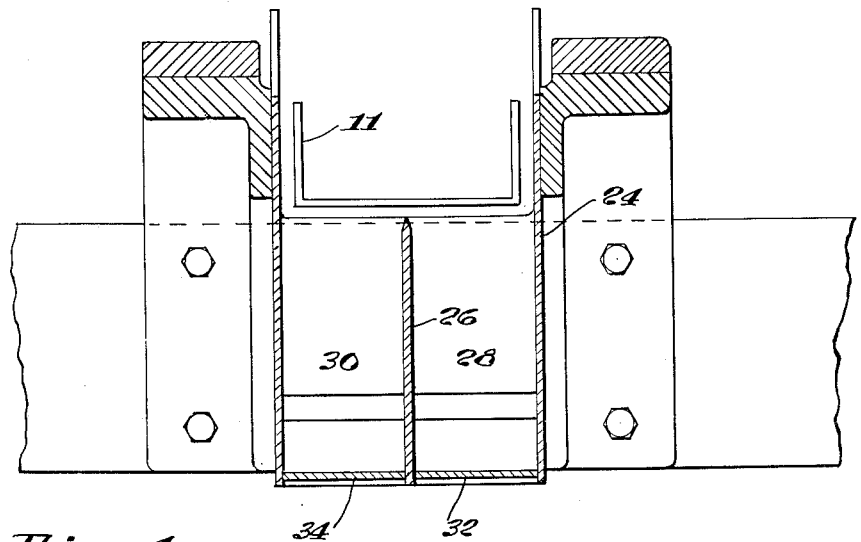

April 18, 1961　　　S. R. HOWARD　　　2,980,251
WEIGHING MACHINE
Filed Oct. 1, 1954　　　　　　　5 Sheets-Sheet 3
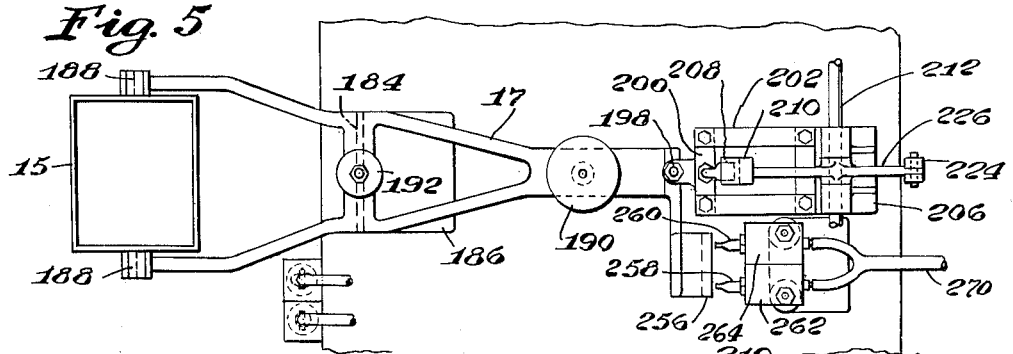
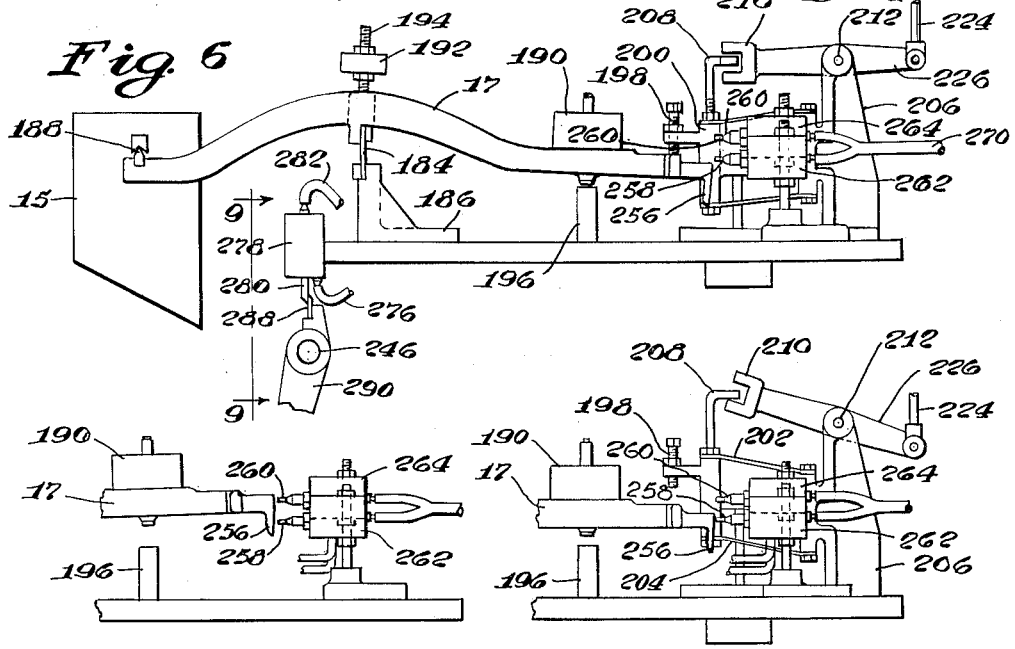
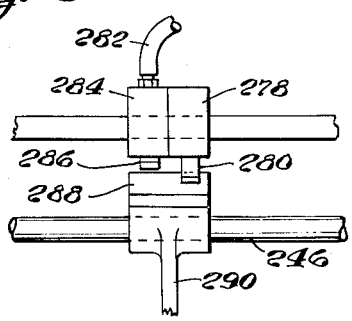
INVENTOR.
Stanley R. Howard
BY
J. Stanley Churchill
ATTORNEY April 18, 1961
S. R. HOWARD
2,980,251
WEIGHING MACHINE
Filed Oct. 1, 1954
5 Sheets-Sheet 4
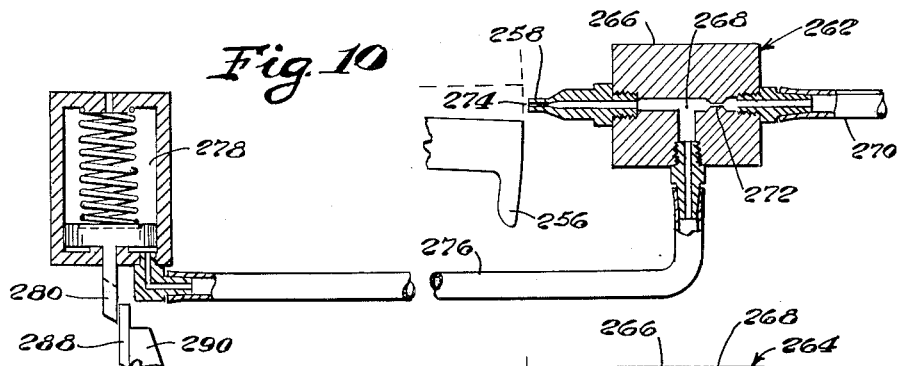
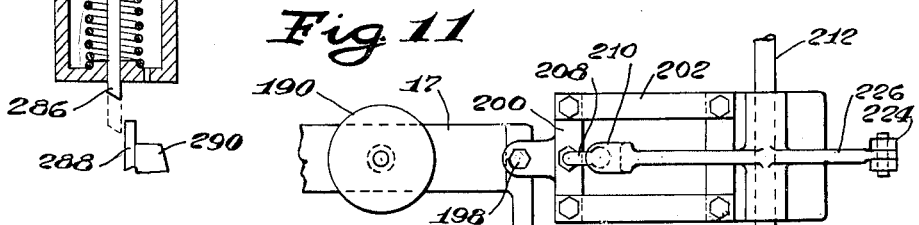
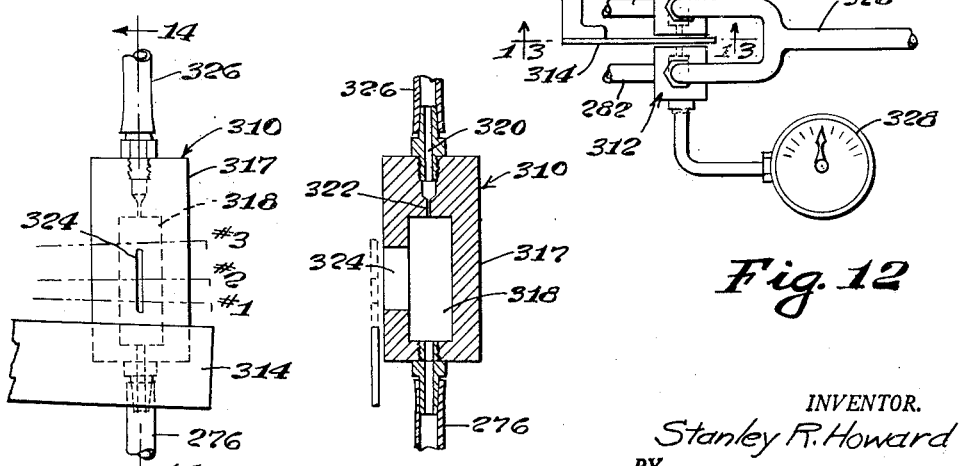
INVENTOR.
Stanley R. Howard
BY
J. Stanley Churchill
ATTORNEY

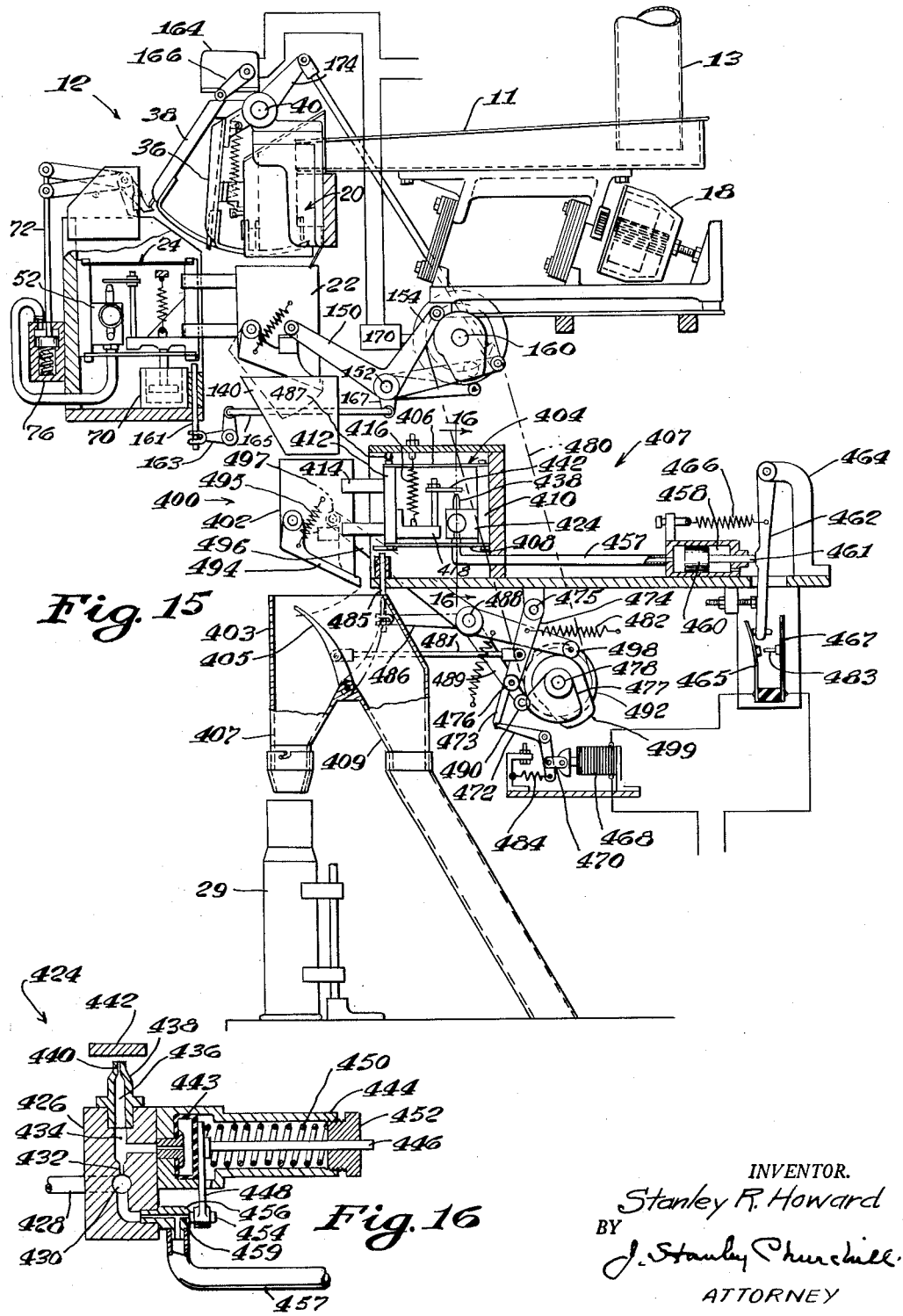

United States Patent Office 2,980,251
Patented Apr. 18, 1961

2,980,251

WEIGHING MACHINE

Stanley R. Howard, Milton, Mass., assignor to Pneumatic Scale Corporation, Limited, Quincy, Mass., a corporation of Massachusetts Filed Oct. 1, 1954, Ser. No. 459,694

15 Claims. (Cl. 209—121)

This invention relates to a weighing machine.

The object of the invention is to provide a novel, simple and highly efficient weighing machine embodying novel and improved check weighing mechanism for rapidly and accurately weighing and check weighing flowable solid material.

A further object of the invention is to provide a novel and improved weighing mechanism particularly adapted for check weighing previously weighed loads in an extremely rapid manner and with increased accuracy.

With these general objects in view and such others as may hereinafter appear, the invention consists in the weighing machine and in the various structures, arrangements and combinations of parts hereinafter described and particularly defined in the claims at the end of this specification.

In the drawings illustrating the preferred embodiment of the invention:

Fig. 3 is a cross-sectional view taken on the line 3—3 of Fig. 1;

Fig. 4 is a cross-sectional view taken on the line 4—4 of Fig. 1;

Fig. 5 is a plan view of the check weighing mechanism shown in Fig. 1;

Fig. 6 is a side elevation of the same;

Figs. 7 and 8 are detail views of a portion of the mechanism shown in Fig. 6 and illustrating the mechanism in different positions of operation;

Fig. 9 is a detail view of latch mechanism as seen from the line 9—9 of Fig. 6;

Fig. 10 is a detail view in cross section of pneumatic control mechanism shown in Fig. 1;

Fig. 11 is a similar view of associated control mechanism;

Fig. 12 is a plan view detail of a modified form of control mechanism;

Fig. 13 is a detail view as seen from the line 13—13 of Fig. 12;

Fig. 14 is a cross-sectional view taken on the line 14—14 of Fig. 13;

Fig. 15 is a side elevation of a modified form of weighing machine embodying the present invention; and Fig. 16 is a detail view in cross section taken on the line 16—16 of Fig. 15.

Figures 1, 2:
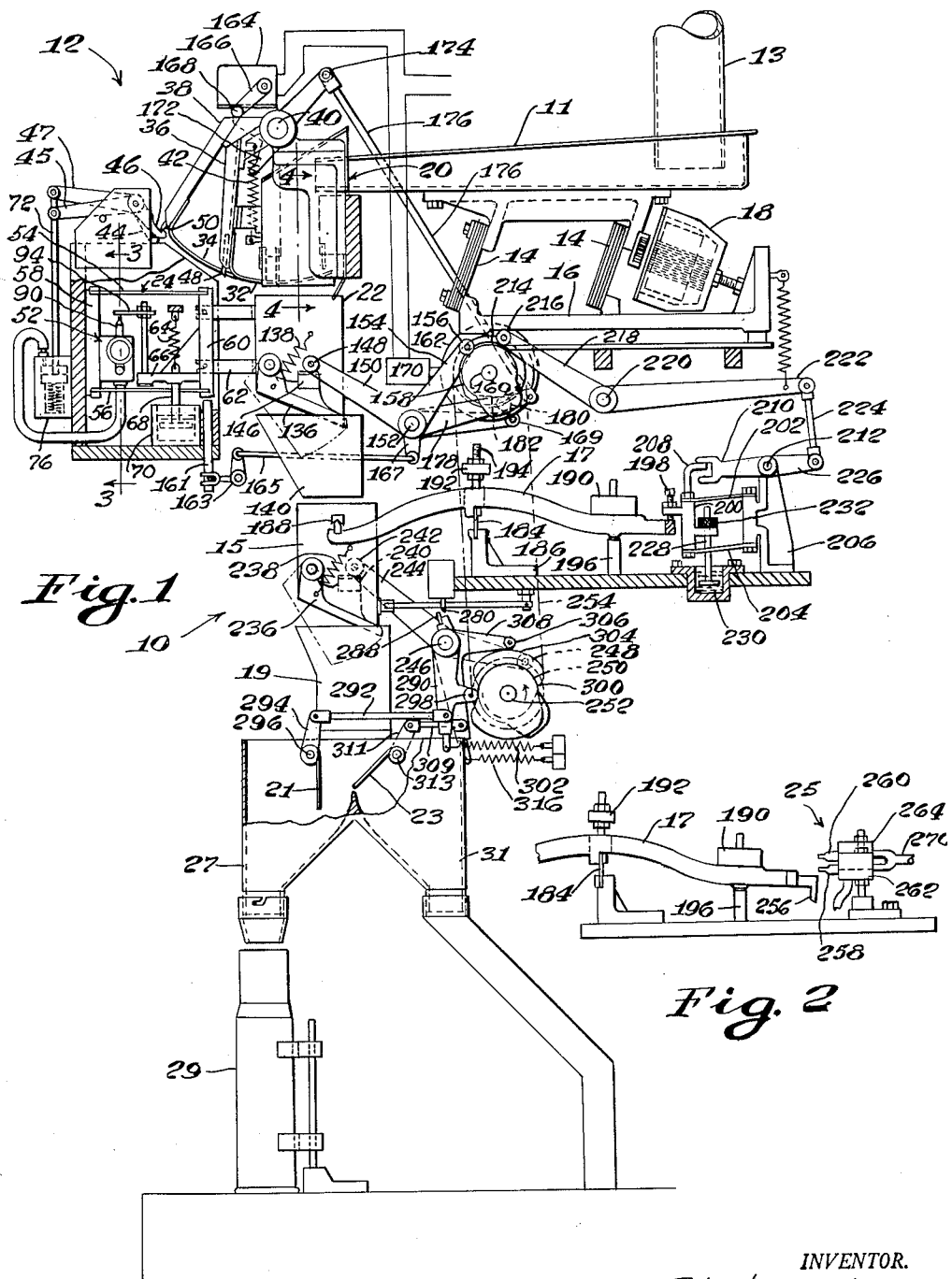
Fig. 1 is a side elevation of the present weighing machine.
Fig. 2 is a detail view of pneumatic control mechanism forming a part of the machine shown in Fig. 1.

In general the present weighing machine is particularly adapted for rapidly and accurately check weighing successive loads formed by an automatic weighing mechanism or other load forming means. In one embodiment of the invention the present check weighing mechanism embodies a novel weighing element comprising a rigid beam suspended upon a thin spring steel strip and having a weighing receptacle at one end and a counterweight at the other end. In accordance with one feature of the present invention, provision is made for indicating the weight of a previously formed load of material placed in the receptacle by the extent of the initial impulse or rocking movement of the beam when the same is unlocked to perform the check weighing operation, the extent of such initial impulse or rocking movement being proportional to the weight of the load and forming an accurate indication of the exact weight being tested. As a result the weight may be rapidly checked as compared to the time usually required for the beam to teeter back and forth until it reaches a position of equilibrium before the weight is indicated, such as occurs in the usual balance beam or in static weighing.

In order to avoid the effect of vibration upon the check weighing scale beam when the beam is unlocked from a solid stop supported in the machine frame, provision is made for temporarily supporting the counterweight end of the beam by a vibration absorbing spring supported stop which may be damped by a dash pot to avoid periodic vibration. In the preferred embodiment of the invention the spring supported stop may comprise a cantilever spring unit which may be weighted so as to hold the counterweight end of the beam down temporarily after the beam has just left the solid stop, whereupon the spring supported stop is removed to permit the beam to rock to a position accurately indicating the exact weight being tested.

Provision is also made in the illustrated embodiment of the invention for releasing the check weighed load into a chamber or trap provided with a gate arranged to be opened through pneumatically operated control means actuated by the movement of the check weigher beam to discharge the load directly into a container to be filled when the check weigher indicates that the load is within predetermined maximum and minimum limits of a predetermined weight, or to prevent opening of the gate to retain the load in the trap to be subsequently discharged into a reject chamber when the check weigher indicates that the load deviates from such predetermined limits over or under the predetermined weight. As a result of the rapidly acting impulse movement of the check weigher scale beam and the pneumatically operated control means, an extremely rapid and accurate check weighing operation may be accomplished, which is particularly adapted for embodiment in an automatic load forming machine, such as an automatic net weight weighing machine.

In a modified form of the invention the control means adapted to control the operation of the discharge gate in accordance with the weight of the load as checked by the check weighing mechanism, provision is made for enabling the weight of the load being check weighed to be indicated to the operator so that suitable adjustments may be made in the check weighing scale to compensate for any repetitive trend of overweight or underweight loads.

In another modified form of the invention the check weighing unit may embody a cantilever type of weighing beam adapted to rapidly and accurately check weigh successive previously formed loads and control means actuated by a relatively small movement of the beam for rejecting such formed loads as are over or under a predetermined weight and utilizing the first impulse or movement of the cantilever beam as an accurate indication of the weight of the load.

Referring now to the drawings and particularly to Fig. 1, in general the present check weighing mechanism indicated generally at 10 is herein illustrated as embodied in an automatic net weight weighing machine indicated generally at 12 which is adapted to automatically weigh and discharge successive net weighed loads to be delivered to the check weighing mechanism 10. As herein shown, the illustrated machine includes vibratory feeding mechanism 11 arranged to feed the material through hopper 20 and into a weighing bucket 22 forming a part of the net weight weighing mechanism. In operation when a predetermined weight is deposited in the weighing bucket 22 the feed of the material through the hopper 20 is interrupted by material cutoff gates 32, 34 controlled by the net weight weighing mechanism, and the net weighed load is then released into a receptacle 15 mounted on a scale beam 17 forming a part of the check weighing mechanism 10.

After the check weighing operation is completed the check weighed load is released into a chamber or trap 19 provided with bottom closing gates 21, 23, and pneumatically operated control mechanism, indicated generally at 25 and cooperating with the scale beam 17 is arranged to effect opening of the gate 21 when the check weighed load is found to come within maximum and minimum limits on the predetermined weight to permit the load to be guided through a funnel 27 directly into a container to be filled, herein shown as comprising a shell casing 29 suitably supported beneath the funnel 27. Conversely, when the check weighed load is found to be overweight or underweight beyond such predetermined limits, the control means is adapted to effect locking of the gate 21 in its closed position, and the load is subsequently released upon opening of the gate 23 to be guided through a funnel 31 and discharged into a reject container.

The weighing machine embodying the novel check weighing mechanism may comprise an automatic net weight weighing machine of the type illustrated and described in the United States patent to S. R. Howard, No. 2,364,902, except as to details hereinafter pointed out, and as herein shown, the illustrated machine includes the vibratory feeder or material delivery conduit 11 into which the material to be weighed is delivered from a source of supply through a supply tube 13. The vibratory conduit 11 is supported by thin flexible straps 14 mounted upon a bracket 16 suitably supported from the machine frame and is arranged to be vibrated by an electrically operated vibratory motor 18 operatively connected between the bracket 16 and the conduit 11 to effect feeding of the material through the conduit in a substantially uniform stream.

The material feeding conduit 11 is arranged to be vibrated continuously to feed a substantially uniform stream of material through the hopper 20 and into the weighing bucket 22 which is supported on a rigid spring cantilever weighing beam indicated generally at 24. The hopper 20 may be divided longitudinally by a partitioning member 26 to provide two passageways 28, 30 through which the material passes to be delivered into the weighing bucket 22, and each passageway may be provided with its individual stream interrupting gate 32, 34 both of which are arranged to be latched in their open position at the beginning of each cycle of operation. Each stream interrupting gate 32, 34 comprises a curved plate attached to arms 36, 38 pivotally mounted on a stud 40 secured in the hopper 20, and each gate is provided with a spring 42 arranged to rock the gate to its closed position. During the weighing operation each gate 32, 34 is arranged to be closed independently of the other, one gate 32 being closed when the material deposited in the weighing bucket 22 reaches a predetermined primary weight and the other gate 34 being closed when the material in the bucket reaches a predetermined final weight.

The latch mechanism for maintaining the stream interrupting gates 32, 34 in their open position during the weighing operation includes pivotally mounted latch members 44, 46 arranged to cooperate with extensions 48, 50 respectively attached to the gate arms 36, 38, and the latch members 44, 46 are arranged to be disengaged to permit independent closing of the gates 32, 34 when the primary and final weights are reached through connections including sensitive control means, herein shown as comprising a pneumatically operated unit indicated generally at 52, and arranged to be actuated by movement of the cantilever weighing beam unit 24.

As illustrated in Figs. 1 and 3, the cantilever weighing beam unit 24 comprises a four-bar parallel linkage having upper and lower cantilever leaf springs 54, 56 of equal length attached at one end to a rigid member 58 secured to the machine frame, the other ends of the leaf springs being secured to a second rigid member 60 to which the weighing bucket 22 is attached as by extension straps 62. A coil spring 64 secured to an arm 66 projecting from the rigid member 60 serves to exert a counterforce on the spring beam, and a rod 68 depending from the arm 66 may be provided with a piston operating in a dash pot 70. In operation when a load is placed in the weighing bucket 22 the weight thereof results in imparting to the bucket a straight line motion in a vertical direction so that every particle in the weighing bucket moves with the same displacement, direction and velocity and any particle produces the same deflection no matter where it is located in the bucket. As illustrated herein, such deflection of the cantilever spring beam unit is arranged to actuate the pneumatically operated unit 52 to effect release of the stream interrupting gates 32, 34. As illustrated in Figs. 1 and 3, the pneumatically operated control unit includes duplicate mechanisms for each gate, each mechanism including a vertically reciprocal spring loaded rod 72 having a piston 74 at one end operating in an air cylinder 76, and connected at its other end to its respective latch arm 45, 47. In operation the piston rod of each dual unit is normally maintained in its downwardly extended position by air pressure, and when a predetermined weight is reached the rod is permitted to move upwardly, thereby effecting rocking of its respective latch to release its gate, as above described.

The pneumatically operated unit 52 cooperating with the cantilever spring weighing beam 24 to control the operation of the material feeding mechanism may and preferably will embody a pressure responsive amplification device, herein shown as a dual unit, each unit being adapted to effect rapid tripping of its respective latch mechanism upon minute deflection of the spring beam. As herein shown, the pneumatically operated unit includes a block 78 having a regulated source of air under pressure conducted through a pipe 80 into a central conduit 82 from which air is conducted through a restricted throat 84 to a primary chamber 86 which in turn communicates with a vertical conduit 88 formed in a jet member 90 attached to the block 78. The member 90 is provided with a small discharge orifice 92 arranged to cooperate with a valve member 94 carried by the spring beam weighing unit 24. Normally, the valve member 94 is spaced slightly from the orifice 92, and the construction of the pneumatically operated unit is such that a large pressure change occurs upon minute movement of the valve member toward the orifice when the spring beam is deflected through a correspondingly minute distance. The primary air chamber 86 is also operatively connected to expansible bellows 96, 98 supported in chambers formed in opposed duplicate laterally extended hollow members 100, 102 attached to the block 78. Each bellows has substantial area and is urged outwardly by the air pressure in the primary air chamber. Each bellows is also arranged to cooperate with a horizontally reciprocal rod 104, 106 supported in the members 100, 102 respectively and provided with depending arms 116, 118 engageable with the outer face of the bellows. The movement of the bellows outwardly in each unit is resisted by springs 108, 110 whose tension may be adjustably controlled by adjusting screws 112, 114 respectively.

As herein illustrated, the depending arms 116, 118 are fast on the reciprocal rods 104, 106, the arms extending through slots formed in the hollow members and provided with valve members 120, 122 respectively for cooperation with the orifices of opposed jet members 124, 126 which communicate with their respective air cylinders 76 which may be termed the secondary air chambers and in which the spring loaded piston rods 72 are mounted for actuating their respective tripping mechanisms. Air is conducted to the secondary air chambers through restricted throats 128, 130 and air pipes 132, 134, and the pressure variations within the secondary air chambers are controlled by the escape of air from the respective escape nozzles 124, 126, each being controlled by the position of the valve members 120, 122. In operation when a load is placed in the weighing bucket 22 the valve 94 carried by the spring beam unit 24 is moved toward the discharge orifice 92 a minute amount thereby effecting a substantial pressure rise in the chamber 86 tending to expand the bellows, and when the pressure overcomes the springs 108, 110 the valves 120, 122 are moved away from their respective escape nozzles 124, 126 thus reducing the pressure in the secondary chambers and permitting the springs to move the piston rods 72 upwardly to trip the latching mechanisms and release the stream interrupting gates 32, 34. In practice the tension in one of the springs 108, 110 may be adjusted by the position of its screws 112, 114 so as to enable one unit to operate to move its piston rod 72 upwardly to release its latch when a certain variation in pressure has occurred within the primary chamber 86 corresponding to one position of the surface of the valve 94 with respect to the escape orifice 92, and the second spring may be adjusted with greater tension so that the operation of the second piston rod to operate the second latch may be caused to take place when the pressure in the primary chamber 86 has reached a greater value corresponding to a closer position of the valve 94 with respect to the orifice 92.

From the description thus far it will be seen that upon minute deflection of the cantilever spring beam 24 to one position under the influence of the primary or bulk load stream deposited in the weighing bucket by the feeding mechanism, the stream of material from one compartment 28 of the hopper 20 is interrupted by the stream cutoff gate 32 permitting a relatively smaller drip stream to continue through the compartment 30, and upon further deflection of the spring beam 24 when the final load is reached the drip stream is interrupted by the second cutoff gate 34.

As herein shown, the weighing bucket 22 is provided with a pivotally mounted shutter 136 yieldingly retained in its closed position by a spring 138, and upon completion of the weighing operation provision is made for opening the shutter to release the weighed load from the bucket, the released material being guided through a funnel 140 into the check weighing receptacle 15 supported on the check weigher scale beam 17. As illustrated in Fig. 1, the shutter 136 is provided with a raised portion 146 on one side thereof arranged to be engaged by a roller 148 carried by one arm 150 of a bell crank pivotally mounted on a rocker shaft 152 journalled in the machine frame. A second arm 154 of the bell crank is provided with a roller 156 arranged to cooperate with a cam 158 fast on a cam shaft 160.

The cantilever weighing unit 24 may be provided with any usual or preferred locking mechanism arranged to hold the cantilever beam in an elevated and inoperative position relative to the pneumatically operated control unit 52 at all times except during the weighing cycle of operation, the lock also forming a support for the free end of the weighing unit during the opening of the shutter 136 to release the weighed load into the check weighing receptacle 15. As herein shown, the locking mechanism may include a vertical rod 161 slidingly mounted in the frame of the unit and arranged to be elevated into engagement with the underside of the beam 24 by a pin and slot connection with one arm of a bell crank 163. The other arm of the bell crank is connected by a link 165 to one arm of a two-armed cam lever 167 pivotally mounted on the shaft 152, the other arm carrying a roller 169 for cooperation with a suitable cam fast on the cam shaft 160.

In operation the cam shaft 160 is controlled to make one revolution each cycle of operation of the weighing machine, and accordingly, the cam shaft may be driven through connections including a one-revolution clutch, indicated generally at 162, which may comprise a pawl and ratchet type of clutch arranged to be disengaged by a pawl stop, as illustrated and described in the Howard Patent No. 2,364,902 above referred to.

As herein shown, provision is made for starting the cam shaft on a new cycle of operation simultaneously with the release of the second stream interrupting gate 34, and for this purpose a switch 164 having an arm 166 provided with a roller 168 is arranged to cooperate with a portion of the gate arm 38, as indicated in Fig. 1. The switch 164 is connected in a circuit having a solenoid 170 arranged to cooperate with the one-revolution clutch 162 so that in operation when the second gate 34 is moved to its closed position the solenoid is actuated to withdraw the pawl stop to permit rotation of the cam shaft. During initial rotation of the cam shaft 160 the cam 158 effects opening of the shutter 136 and release of the weighed load into the weigher receptacle, as above described, and upon continued rotation of the cam shaft the shutter 136 is permitted to close by virtue of the spring 138.

During subsequent rotation of the one-revolution cam shaft provision is made for resetting the stream interrupting gates 32, 34 to their open position to initiate a succeeding weighing cycle, the resetting movement of the gate 34 effecting operation of the switch 164 so as to permit return of the pawl stop and disengagement of the one-revolution clutch to stop the cam shaft at the end of one revolution. The resetting or relatching mechanism may comprise a cam operated resetting arm 172 pivotally mounted on the stud 40, a second arm 174 being connected by a link 176 to a cam lever 178 pivotally mounted at 152. The cam lever 178 is provided with a cam roll 180 for cooperation with a cam 182 fast on the cam shaft 160. Thus, in the operation of the weighing machine the gates 32, 34 are engaged by the resetting arm 172 and rocked to their open position to effect relatching of the latch elements 44, 46 and 48, 50, and any material accumulated in the feed hopper 20 by the continuously operated feed conduit 11 is deposited into the weighing bucket 22. It will be understood that the cantilever spring weighing beam unit 24 is held in its elevated or locked position by the locking rod 161 during opening of the shutter 136 and release of the load into the check weigher receptacle 15 and that the rod 161 is lowered free of the unit 24 during the weighing operation.

From the description thus far it will be seen that the net weight weighing machine is adapted to automatically weigh and deposit successive net weighed loads into the check weigher receptacle 15, forming a part of the check weighing mechanism 10, and as herein shown, the check weighing mechanism includes the rigid scale beam 17 suspended upon a thin spring steel strip 184 supported in a bracket 186 secured to the machine frame. The receptacle 15 may be mounted on knife edges 188 at one end of the scale beam, and the other end of the scale beam may be provided with the usual counterweight 190. The scale beam is also provided with a central counterweight 192 adjustably mounted on a threaded rod 194 upstanding from the beam for enabling the center of gravity of the beam to be varied for most efficient weighing performance.

Provision is made for locking the scale beam 17 against a solid stop 196 secured to and upstanding from the machine frame, and in order to avoid the effects of periodic vibration on the scale beam when it is unlocked to perform the check weighing operation, the counterweight end of the scale beam is arranged to be temporarily supported by a resiliently mounted and weighted vibration absorbing upper stop 198 to permit a slight separation of the beam from the solid stop for an instant immediately prior to complete release of the beam to perform the check weighing operation.

As herein shown, the upper stop 198 is adjustably mounted in an extension from a member 200 supported by cantilever leaf spring elements 202, 204 secured to a bracket 206 attached to the machine frame and forming in effect a four-bar parallel linkage. The member 200 is provided with an upstanding hook member 208 arranged to be engaged by upper and lower arms of a yoke 210 pivotally mounted at 212 in the bracket 206. The yoke 210 is arranged to be rocked by a cam 214 fast on the cam shaft 160 through linkage including a cooperating cam roll 216 carried by an arm 218 pivotally mounted at 220, and a second arm 222 connected by a link 224 to an arm 226 forming a part of the yoke 210. The member 200 is further provided with a depending rod 228 having a piston at its lower end operating in a dash pot 230 secured to the machine frame, and the upper end of the rod 228 serves to support a weight 232.

In operation when the load is deposited into the receptacle 15 the scale beam 17 is in its locked position with the upper arm of the yoke 210 in engagement with the hook 208 and with the upper stop 198 holding the beam firmly down against the lower solid stop 196, as illustrated in Fig. 1. Thereafter, the cam 214 operates to move the yoke 210 to a neutral position free of the hook 208, as illustrated in Fig. 6, to permit the vibration absorbing upper stop 198 to rise slightly, the scale beam following along in engagement with the upper stop so that the beam is slightly spaced from the solid stop 196, as shown. In practice the weight 232 carried by the cantilever spring unit may be chosen with respect to the weight of material in the receptacle 15 so as to permit the counterweight end of the beam to rise just out of contact with the solid stop 196 when the yoke is moved to its neutral position. Thereafter, the cam 214 operates to rock the yoke 210 to engage the lower arm thereof with the hook 208 to effect lifting of the cantilever spring unit to a raised position, as shown in Fig. 7, to permit the scale beam to rock under the influence of the load in the receptacle to a first impulse position in accordance with the weight of the load, the extent of such first rocking movement being proportional to and an accurate indication of the exact weight of the load.

When the check weighing operation has been performed the cam 214 again effects locking of the scale beam 17 to its initial position whereupon the check weighed load may be released into the chamber or trap 19 provided with the bottom closing gates 21, 23. As herein illustrated, the receptacle 15 is provided with a pivotally mounted shutter 236 yieldingly retained in its closed position by a spring 238. The shutter 236 is provided with a raised portion 240 on one side thereof arranged to be engaged by a roller 242 carried by one arm 244 of a lever pivotally mounted on a rocker shaft 246. A second arm of the lever is provided with a roller 248 arranged to cooperate with a cam 250 fast on a lower cam shaft 252 which may be driven from and in timed relation to the cam shaft 160 by a chain and sprocket drive indicated at 254.

As herein illustrated, rocking of the scale beam 17 to its first impulse position is arranged to cooperate with the control means, indicated generally at 25, to effect opening of the gate 21 when the load is indicated as being within predetermined limits of a predetermined weight so as to permit the load discharged from the receptacle 15 to flow through the funnel 27 and into the container 29, or to cause the gate 21 to be retained in its closed position when the load is indicated as being either overweight or underweight to trap the load thus discharged, the trapped load being subsequently permitted to flow through the funnel 31 into the reject conduit.

As herein shown, the counterweight end of the scale beam 17 is provided with a curved tail or valve member 256 arranged to cooperate with the jets 258, 260 of pneumatically operated units 262, 264 respectively, each unit 262, 264 being similar in construction and mode of operation. As shown in detail in Figs. 10 and 11, each pneumatically operated unit comprises a block 266 having a chamber 268 supplied with a source of air under pressure by a conduit 270, the air being arranged to pass through a restricted throat portion 272 into the chamber 268. The jets 258, 260 connected to their respective chambers are each provided with a small orifice 274 through which the air is permitted to escape, and in operation when the air escaping from a jet is obstructed, as by the passage of the valve member 256 in front of the jet, a substantial pressure rise occurs in the chamber 268. One of the pneumatically operated units 262 is connected by a conduit 276 with the lower end of a secondary chamber 278 having a spring pressed piston provided with a depending latch member 280 extended below the chamber, and the other pneumatically operated unit 264 is similarly connected by a conduit 282 to the upper end of a secondary chamber 284 also having a spring pressed piston provided with a depending latch member 286 extended below its chamber.

The latch member 280 is arranged to cooperate with an extended portion 288 of a lever 290 pivotally mounted on the rock shaft 246, the lever 290 being connected by a link 292 to an arm 294 fast on a pin 296 to which the gate 21 is attached. The lever 290 is also provided with a cam roll 298 arranged to cooperate with a cam 300 fast on the cam shaft 252. The latch 280 is normally in engagement with the extended portion 288 of the lever 290 to lock the gate 21 in its closed position and to hold the cam roll 298 away from its cam 300, and a spring 302 connected to the lever 290 is arranged to urge the roller to follow its cam to effect opening of the gate 21 when released by the latch member 280. The second latch member 286, also arranged to cooperate with the extended portion 288 is normally disengaged from the same, as shown in Fig. 9, and is arranged to engage the extended portion only when the check weighed load is found to be overweight. As indicated in Fig. 6, the pneumatically operated units 262, 264 are arranged side by side, one unit being supported to dispose its jet slightly higher vertically than the other unit relative to the valve member 256.

In operation when the scale beam 17 is rocked under the influence of the weight of the load to dispose the valve member 256 in a position below the jets, as shown in Fig. 6, indicating an underweight load, the latch member 280 will remain in its normally locked position so that when the load is released from the receptacle 15 the load will be trapped in the chamber 19 on top of the closed gates 21, 23 to be subsequently rejected upon opening of the gate 23. When the scale beam is rocked to dispose the valve member 256 in a position to cover the lower jet 258, as shown in Fig. 7, indicating that the load is within predetermined limits of the predetermined weight, the pressure in the chamber 268 of the unit 262 will be increased to effect elevation of the spring pressed latch member 280 and release of the lever 290 to permit opening of the gate 21 and discharge of the material into the container 29 as shown in Fig. 1. In the event that the load is overweight the scale beam will be rocked to dispose the valve member 256 in a position to cover both jets, as shown in Fig. 8. When this occurs the pressure in both lower and upper pneumatically operated units 262, 264 is increased, the lower unit 262 effecting elevation of the latch member 280 and the upper unit 264 effecting downward extension of the latch member 286 into locking engagement with the lever 290 to prevent opening of the gate 21. Thus, the overweight load subsequently released from the receptacle 15 will be trapped in the chamber 19 to be thereafter rejected. It will be understood that the cam 300 is timed to maintain the gate 21 in its closed position during the check weighing operation so that when the normally engaged latch member 280 is elevated the lever 290 will remain in a position to be engaged and locked by the latch member 286 when an overweight load occurs.

The gate 23 may be opened to reject an abnormal load through the funnel 31 by cam operated linkage, herein shown as comprising a cam 304 fast on the cam shaft 252 and a cam roll 306 carried by one arm of a bell crank 308 pivotally mounted on the shaft 246. The other arm of the bell crank 308 is connected by a link 309 to an arm 311 fast on a pin 313 to which the gate 23 is attached. A spring 316 connected to the second arm of the bell crank is arranged to urge the gate 23 into a closed position. In operation the gate 23 is opened and closed each cycle of operation, the cam 304 being timed to effect opening of the gate 23 at a later time in the cycle than the cam 300 for opening the gate 21. Thus, when a normal load is deposited into the chamber 19, the gate 21 will be opened to discharge the load into the container 29, the gate 23 remaining closed at this time. When an underweight or overweight load is deposited into the chamber, the gate 21 will be locked in its closed position to trap the load, subsequent opening of the gate 23 by the cam 304 effecting rejection of the abnormal load. It will be understood that in practice either one of the gates 21, 23 may be in its open position when the load is released from the receptacle 15 so that the check weighed load may be discharged directly into the container 29 or into the reject chute 31 in accordance with the condition of the load as detected by the check weighing mechanism.

Referring now to Figs. 12, 13 and 14, in a modified form of the invention, the pneumatically operated control units 262, 264 are replaced by spaced control units 310, 312 arranged to cooperate with a vane 314 by the counterweight end of the scale beam 17. As best shown in Fig. 14, each pneumatically operated unit 310, 312 may comprise a block 317 provided with a chamber 318 having an inlet 320 communicating with the chamber 318 through a restricted throat portion 322. One side of each chamber is provided with relatively narrow, elongated slot 324 through which the air in the chambers may escape. Air may be supplied to the chambers from a common source of air under pressure through the pipe 326. As illustrated in Fig. 12, the units 310, 312 are disposed in spaced relation with the relatively narrow slots facing each other, and the vane 314 is arranged to move into and out of the space between the units to restrict the flow of air therefrom through said slots 324. The chambers 318 of each unit 310, 312 may be connected by the air lines 276, 282 to the secondary chambers 278, 284 provided wtih the latch members 280, 286 respectively, as illustrated in Figs. 10 and 11.

In operation when the vane 314 is rocked upwardly to obstruct the air escaping from both units 310, 312, a substantial pressure rise occurs in each chamber. When the vane 314 is disposed below the slots or is rocked a short distance therebetween to approximately the dotted line position #1, as illustrated in Fig. 13, indicating that the load in the check weighing receptacle is underweight, little or no pressure rise occurs, and the latch 280 will remain in locked engagement with the arm 290 so that the underweight load will be trapped in the chamber 19 to be subsequently rejected. When the vane 314 is moved to a position between #1 and #2 positions, as indicated in dotted lines in Fig. 13, wherein about one-half of the slot is sealed off, indicating that the check weighed load is within normal limits of a predetermined weight, the pressure in the chambers 318 will rise sufficiently to effect elevation of the latch member 280 to effect opening of the gate 21 and release of the load into the container 29. In the event of an overweight load the vane 314 will be moved beyond position #2 to a position between #2 and the upper position shown at #3 in Fig. 13, wherein the entire slot is sealed off, which will effect a pressure rise in the chambers 318 sufficient to first elevate the latch 280 and then lower the latch 286 to effect locking of the arm 290 to prevent opening of the gate 21 and thus trap the load in the chamber 19 to be subsequently rejected. In the modified form of the invention described, a calibrated air gauge 328 may be connected to one of the units 312, and since the pressures in both units 310 and 312 are the same the pressure recorded will be proportional to the weight of the load and thus serve to indicate any repetitive abnormal trend in the net weight weighing operation so that manual adjustments may be made to correct such trend.

Referring now to Figs. 15 and 16, in another modified embodiment of the invention the check weighing unit may take the form of a cantilever spring weighing beam unit, indicated generally at 400, adapted to effect either acceptance or rejection of the check weighed load in accordance with the movement of the beam under the influence of the load, the extent of such movement being proportional to and an accurate indication of the exact weight of the load.

As herein shown, the modified form of check weighing mechanism 400 is also illustrated as embodied in an automatic net weight weighing machine, indicated at 12, which may be the same in construction and mode of operation as that disclosed in the embodiment illustrated in Fig. 1, and which is adapted to automatically weigh and discharge successive net weight loads to be delivered to the check weighing mechanism 400. In general in the modified embodiment of the invention, the net weighed load is released into a check weighing receptacle 402 carried by and forming a part of the cantilever check weighing unit 400. Provision is made for locking the weighing element during the delivery of the load from the net weight weighing bucket 22 and for thereafter unlocking the element to perform the check weighing operation, and after the check weighing operation is completed the weighing element may be again locked whereupon the check weighed load may be released into a two-legged hopper 403 provided with a pivoted gate member 405 at its upper end. Pneumatically operated control means, indicated generally at 407, cooperating with the cantilever spring beam unit 400 is arranged to effect rocking of the gate 405 to one side of the hopper mouth when the check weighed load is found to come within predetermined limits of a predetermined weight to permit the load released from the check weighing receptacle 402 to be guided through one leg 407 of the hopper directly into the container 29 to be filled. When the check weighed load is found to be underweight or overweight beyond such predetermined limits, the control means is adapted to rock the pivoted gate 405 to the other side of the hopper mouth to guide the abnormal weight load through the other leg 409 of the hopper to be rejected.

As herein shown, the receptacle 402 is supported on a rigid cantilever spring weighing beam 404 which may comprise a four-bar parallel linkage having upper and lower cantilever leaf springs 406, 408 equal in length. The leaf springs are attached at one end to a rigid member 410 secured to the machine frame, the other ends of the leaf springs being secured to the second rigid member 412 to which the check weighing receptacle 402 is attached by extension straps 414. A coil spring 416 secured to an arm 418 projecting from the rigid member 412 serves to exert a counterforce on the spring beam.

In operation when a load is placed in the receptacle the beam is deflected a minute distance proportional to the weight of the load, and the cantilever beam is arranged to cooperate with a pneumatically operated control unit 424 forming a part of the control means 407 arranged to effect acceptance or rejection of the check weighed load. As herein shown, the pneumatically operated unit 424, as illustrated in detail in Fig. 16, may include a block 426 having a regulated source of air under pressure conducted through a pipe 428 into a central chamber 430 from which air is conducted through a restricted throat 432 to a primary chamber 434 which in turn communicates with a vertical passageway 436 formed in a jet member 438 attached to the block 426. The jet member 438 is provided with a small discharge orifice 440 arranged to cooperate with a valve member 442 carried by the spring beam weighing unit 404. Normally, the valve member 442 is spaced slightly from the orifice 440, and the construction of the unit is such that a large pressure change occurs upon minute movement of the valve member toward the orifice when the spring beam is deflected under the influence of the load. The primary air chamber is operatively connected to an expansible bellows 443 supported in a laterally extended hollow member 444 attached to the block 426. The bellows 443 is arranged to cooperate with a horizontally reciprocal rod 446 supported in the member 444 and provided with a depending arm 448 fast thereon. The bellows is urged outwardly by the air pressure in the primary chamber, and the movement of the bellows outwardly is resisted by a spring 450 whose tension may be adjusted by the threaded end cap member 452. The arm 448 depends through a slot formed in the hollow member 444 and is provided with a valve member 454 for cooperation with the orifice of an air nozzle 456 in communication with the central chamber 430. The jet member 456 is connected by a pipe 457 to communicate with a cylinder chamber 458 which may be termed a secondary air chamber comprising part of the control means for controlling the disposition of the load released from the check weighing receptacle in accordance with the weight thereof. In operation, the valve member 442 carried by the weighing element may be adjusted to normally provide a small space between the valve member and the orifice 440 when the weighing element is in an elevated position, and upon minute deflection of the weighing element under the influence of the load, the valve 442 is moved toward the orifice 440 a minute amount, thereby effecting a substantial pressure rise in the primary air chamber 434 tending to expand the bellows 443 against the pressure of the coil spring 450. The secondary valve 454 is normally disposed to cover the air escape orifice 459 in the nozzle 456 so that maximum pressure normally exists in the secondary chamber 458, and when the pressure in the primary air chamber 434 acting on the bellows 443 overcomes the spring 450 the secondary valve 454 is thus moved to the right to expose the opening 459 in the escape nozzle 456, thus reducing the pressure in the secondary chamber 458.

As herein shown, the secondary air chamber 458 is provided with a piston 460 slidingly mounted therein and having a rod 461 engageable with a contact breaking arm 462 pivotally mounted in a bracket 464 attached to the machine frame. The rod 461 operates to urge the arm 462 to the right, and a coil spring 466 connected to the arm is arranged to urge the same to the left. The arm 462 is arranged to cooperate with spring contacts 465, 467 in an electrical circuit connected to a solenoid 468 whose armature is connected by a link 470 to a pivoted latch member 472 arranged to engage an extension 473 of a cam lever 474 pivotally mounted at 475. The lever 474 is provided with a cam roll 476 arranged to cooperate with a cam 477 fast on a cam shaft 478 rotated through a chain and sprocket drive 480 from the main cam shaft 160. The lever 474 is connected by a link 481 to the pivoted gate 405, the latch member 472 operating to maintain the gate 405 in a position to reject the load, as illustrated in Fig. 15. A spring 482 is arranged to urge the lever 474 to the right to move the gate 405 to the dotted line position shown in Fig. 15 when the lever is released by the latch. As herein shown, the spring contacts 465, 467 are arranged to cooperate with an intermediate or bridging contact 483 to close the circuit to the solenoid 468 to effect rocking of the latch member 472 and release of the gate rocking arm 474, and movement of either contact 465, 467 away from the intermediate contact 483 effects opening of the circuit to the electromagnet. A spring 484 connected to the latch member 472 is arranged to rock the latter into a position to hold the lever 474 in its reject position, as shown, when the solenoid is deenergized, the cam 477 operating to move the lever 474 into latching position each cycle of operation.

In operation the pressure variation within the secondary air chamber 458 is controlled by the escape of air from the nozzle 456 as determined by the position of the valve member 454, and when an overweight load is deposited in the check weighing receptacle 402, deflection of the cantilever weighing beam 404 will effect a pressure rise in the primary chamber 434 sufficient to move the valve 454 a substantial distance away from the escape nozzle 456. Thus, the pressure in the secondary chamber 458 is substantially reduced and the contact breaking arm 462 is permitted to rock to the left, as shown, to disengage contact 465 from the intermediate contact 483 and to deenergize the solenoid 468 permitting the latch member 472 to lock the gate in its reject position. When the load deposited in the check weighing receptacle is found to be within predetermined limits of the predetermined weight the deflection of the weighing beam will be such as to effect a pressure rise in the primary chamber sufficient to effect only a slight movement of the valve 454 away from the escape nozzle so that the pressure in the secondary chamber will be such as to dispose the arm 462 in an intermediate position wherein both contacts 465, 467 engage the bridging contact 483. The solenoid 468 is thus energized to rock the latch 472 and release the lever 474 to effect rocking of the gate 405 to the dotted line position shown in Fig. 15 in which position the subsequently released load will be guided through the leg 407 of the hopper into the container 29. When an underweight load is deposited in the check weighing receptacle 402 little or no deflection of the cantilever beam unit 404 will occur so that the pressure rise in the primary chamber will not be effective to overcome the spring 450, and the valve member 454 will remain in engagement with the escape nozzle 456. Thus, the pressure in the secondary chamber 458 will be such as to rock the contact arm 462 to the right to open the circuit between the contacts 467 and 483, thus deenergizing the solenoid and permtting the latch to lock the gate in its reject position. It will be understood that the spring 466 may be adjusted to control the position of the arm 462 relative to the spring contacts 465, 467.

From the description thus far it will be seen that in operation the cantilever check weighing beam 404 is adapted to check weigh the load deposited into the receptacle 402 from the weighing bucket 22 of the net weight weighing machine and to operate control mechanism for passing a load found to be within normal limits of a predetermined weight into a container, or for rejecting a load found to be of a weight beyond said predetermined limits in a rapid and accurate manner. In practice provision is made for maintaining the cantilever weighing beam 404 in its elevated or locked position except during the check weighing operation, and as herein shown, this may be accomplished by a vertical rod 485 slidingly supported in the machine frame and engageable with the underside of the check weighing beam, the upper end of the beam engaging a stop 487. The rod 485 may be connected by a pin and slot connection to an arm 486 of a two-armed lever pivotally mounted at 488, the other arm 489 being provided with a roller 490 cooperating with a cam 492 fast on the cam shaft 478. In the operation of the check weighing mechanism the weighing unit 404 is maintained in its locked position by the rod 485 during the time the load is being deposited into the receptacle 402 preparatory to the check weighing operation whereupon the rod is lowered free of the beam to permit the beam to be deflected a distance substantially proportional to the weight of the load. Thereafter, the weighing beam is returned to its elevated or locked position to support the receptacle during the release of the check weighed load into the hopper 403. As herein shown, the receptacle 402 is provided with a shutter 494 arranged to be opened to release the load in a manner similar to that previously described wherein a spring 495 is arranged to hold the shutter in its closed position, and a two-armed lever 496 pivotally mounted at 488 is provided on one arm with a roller 497 engageable with a portion of the shutter 494, the other arm having a cam roll 498 cooperating with a cam 499 fast on the cam shaft 478. It will be understood that the cam 477 may be designed to retain the gate 405 in its reject position until the check weighing operation is completed whereupon the gate 405 will be permitted to assume either a reject position or a container filling position as determined by the latch 472 at the end of the check weighing operation. Thus, subsequent movement of the weighing beam 404 to its locked position preparatory to release of the check weighed load will not affect the position of the gate as determined by the check weighing operation, the cam 477 operating to reset the gate to its reject position at the end of each cycle of operation.

In a modified form of the structure shown in Fig. 15 the cam 477 may be arranged to permit lowering of the cantilever beam slightly away from the solid upper stop 487 in order to avoid the effects of vibration in a manner similar to the operation of the check weighing machine illustrated in Fig. 1, and to thereafter effect sudden release of the beam to permit it to move to an initial impulse position.

From the above description it will be seen that the present check weighing mechanism as embdied in a net weight weighing machine or other load forming means is capable of rapidly and accurately determining the weight of a preformed load by the movement of the weighing element, the distance of such movement being substantially proportional to the weight of the load, and to either accept the load for delivery to a container when the load is found to be within normal limits of a predetermined weight or to reject a load deviating beyond such normal limits in a simple, rapid and efficient manner.

While the preferred embodiment of the invention has been herein illustrated and described, it will be understood that the invention may be embodied in other forms within the scope of the following claims.

Having thus described the invention, what is claimed is:

1. In a machine of the character described, in combination, check weighing means including a weighing element movable under the influence of a preformed load placed thereon, means for locking the weighing element in an inoperative position during the placing of the load thereon including a fixed stop and a vibration absorbing member, means for then moving the vibration absorbing member to first permit slight movement of the weighing element out of contact with said fixed stop and for thereafter suddenly removing the vibration absorbing member and releasing the weighing element to permit sudden movement of the element to an initial impulse position proportional to the weight of the load prior to coming to rest in a balanced position, and means cooperating with the weighing element for sensing the extent of the initial impulse movement to determine the weight of the load relative to a predetermined weight.

2. In a machine of the character described, in combination, check weighing means including a weighing element having a load receiver and movable under the influence of a preformed load placed thereon, means for locking the weighing element in an inoperative position during the placing of the load thereon including a fixed stop and a vibration absorbing member, means for then moving the vibration absorbing member to first permit slight movement of the weighing element out of contact with said fixed stop and for thereafter suddenly removing the vibration absorbing member and releasing the weighing element to permit sudden movement of the element to an initial impulse position proportional to the weight of the load prior to coming to rest in a balanced position, means cooperating with the weighing element for sensing the extent of the initial impulse movement to determine the weight of the load relative to a predetermined weight, means for discharging the check weighed load from said load receiver, and guide means responsive to said sensing means for guiding the discharged load into one path if the same is found to be within predetermined limits of a predetermined weight and for guiding the load into a second path in the event the same is found to deviate beyond predetermined limits of said predetermined weight.

3. In a machine of the character described, in combination, check weighing means including a weighing element having a load receiver and movable under the influence of a preformed load placed thereon, means for locking the weighing element in an inoperative position during the placing of the load thereon including a fixed stop and a vibration absorbing member, means for then moving the vibration absorbing member to first permit slight movement of the weighing element out of contact with said fixed stop and for thereafter suddenly removing the vibration absorbing member and releasing the weighing element to permit sudden movement of the element to an initial impulse position proportional to the weight of the load prior to coming to rest in a balanced position, pneumatically operated means cooperating with the weighing element for sensing the extent of the initial impulse movement to determine the weight of the load relative to a predetermined weight, means for discharging the check weighed load from said load receiver, and guide means controlled by said pneumatically operated means for guiding the discharged load into one path if the same is found to be within predetermined limits of a predetermined weight and for guiding the load into a second path in the event the same is found to deviate beyond predetermined limits of said predetermined weight.

4. In a machine of the character described, in combination, check weighing means including a scale beam having a load receiver and mounted to rock under the influence of a preformed load placed thereon, means for locking the scale beam in an inoperative position during the placing of a preformed load thereon including a fixed stop and a vibration absorbing member, means for then moving the vibration absorbing member to first permit slight movement of the weighing element out of contact with said fixed stop and for thereafter suddenly removing the vibration absorbing member and releasing the scale beam to permit sudden rocking of the beam to an initial impulse position proportional to the weight of the load prior to coming to rest in a balanced position, pneumatically operated means cooperating with the beam for sensing the extent of the initial impulse movement to determine the weight of the load relative to a predetermined weight, means for discharging the check weighed load from said load receiver, and guide means controlled by said pneumatically operated sensing means for guiding the discharged load into one path if the same is found to be within predetermined limits of a predetermined weight and for guiding the load into a second path in the event the same is found to deviate beyond predetermined limits of said predetermined weight.

5. In a machine of the character described, in combination, check weighing means including a scale beam having a load receiver mounted to rock under the influence of a preformed load placed thereon, means for locking the scale beam in an inoperative position during the placing of a preformed load thereon and for thereafter suddenly releasing the scale beam to permit sudden rocking of the beam to an initial impulse position proportional to the weight of the load prior to coming to rest in a balanced position, pneumatically operated means cooperating with the beam for sensing the extent of the initial impulse movement to determine the weight of the load relative to a predetermined weight, means for discharging the check weighed load from said load receiver, guide means controlled by said pneumatically operated sensing means for guiding the discharged load into one path if the same is found to be within predetermined limits of a predetermined weight and for guiding the load into a second path in the event the same is found to deviate beyond predetermined limits of said predetermined weight, said scale beam locking means including a solid stop engageable with the underside of the beam, and a vibration absorbing stop engageable with the upper side for firmly holding the beam against the solid stop during the placing of a load thereon, means for moving said vibration absorbing stop for first permitting slight rocking of the beam just out of contact with the solid stop and then effecting release of the beam entirely to permit the beam to perform the check weighing operation.

6. In a machine of the character described, in combination, check weighing means including a scale beam having a load receiver mounted to rock under the influence of a preformed load placed thereon, means for locking the scale beam in an inoperative position during the placing of a preformed load thereon and for thereafter suddenly releasing the scale beam to permit sudden rocking of the beam to an initial impulse position proportional to the weight of the load, pneumatically operated sensing means cooperating with the beam for sensing the extent of the initial impulse movement to determine the weight of the load relative to a predetermined weight, means controlled by said pneumatically operated means for rejecting the load in the event the same is found to deviate beyond predetermined limits of said predetermined weight, a discharge hopper, means for discharging the check weighed load from said receiver into the hopper, said rejecting means including a pair of gates in said hopper normally closed in the path of the discharged load, said pneumatically operated means effecting opening of one gate to permit a normal weight load to flow into a container, or effecting opening of the second gate to reject a load deviating from said normal weight.

7. In a machine of the character described, in combination, check weighing means including a cantilever spring weighing beam having a load receiver and mounted to move under the influence of a load placed thereon, means for locking the cantilever beam in an inoperative position during the placing of a preformed load thereon, said locking means comprising opposed upper and lower stops including a fixed upper stop and a movable lower stop, means for first moving the movable stop a relatively small distance after a preformed load has been placed thereon to permit the weighing element to move a slight distance away from the fixed stop to reduce the effects of periodic vibration and for thereafter suddenly releasing the beam to permit rapid movement of the beam to an initial impulse position proportional to the weight of the load, pneumatically operated sensing means cooperating with the beam for sensing the extent of said initial impulse movement to determine the weight of the load relative to a predetermined weight, and means controlled by said pneumatically operated sensing means for rejecting the load in the event the same is found to deviate beyond predetermined limits of said normal weight, a discharge hopper, means for discharging the check weighed load from said receiver into the hopper, said rejecting means including a gate in said hopper normally disposed in the path of the discharged load to effect rejection of the load, said pneumatically operated means effecting locking of the gate in its reject position when the load is found to deviate beyond predetermined limits of a normal weight or permitting rocking of the gate to guide the load into a container when the load is found to come within said predetermined limits.

8. In a machine of the character described, in combination, load forming mechanism for forming successive loads of substantially uniform weight, check weighing mechanism, means for delivering successive preformed loads to said check weighing mechanism, said check weighing mechanism including a weighing element movable under the influence of a load delivered thereto, means for locking the weighing element in an inoperative position during delivery of the load thereto including a fixed stop and a vibration absorbing member arranged to support the weighing element free of said fixed stop after the load is delivered thereto and for thereafter suddenly removing the vibration absorbing member and releasing the weighing element to permit sudden movement of the element to an initial impulse position proportional to the weight of the load prior to coming to rest in a balanced position, and means cooperating with the weighing element for sensing the extent of the initial impulse movement to determine the weight of the load relative to a predetermined weight.

9. In a machine of the character described, in combination, load forming mechanism for forming successive loads of substantially uniform weight, check weighing mechanism, means for delivering successive preformed loads to said check weighing mechanism, said check weighing mechanism including a weighing element having a load receiver and movable under the influence of a load delivered thereto, means for locking the weighing element in an inoperative position during delivery of the load thereto including a fixed stop and a vibration absorbing member arranged to support weighing element free of said fixed stop after the load is delivered thereto and for thereafter suddenly removing the vibration absorbing member and releasing the weighing element to permit sudden movement of the element to an initial impulse position proportional to the weight of the load prior to coming to rest in a balanced position, means cooperating with the weighing element for sensing the extent of the initial impulse movement to determine the weight of the load relative to a predetermined weight, and guide means responsive to said sensing means for guiding the discharged load into one path if the same is found to be within predetermined limits of a predetermined weight and for guiding the load into a second path in the event the same is found to deviate beyond predetermined limits of a normal weight.

10. In a machine of the character described, in combination, net weight weighing mechanism for forming successive loads of substantially uniform weight, check weighing mechanism, means for delivering successive net weighed loads to said check weighing mechanism, said check weighing mechanism including a scale beam having a load receiver and mounted to rock under the influence of a load delivered thereto, means for locking the scale beam in an inoperative position during delivery of a load thereto including a fixed stop and a vibration absorbing member arranged to support the weighing element free of said fixed stop after the load is delivered thereto and for thereafter suddenly removing the vibration absorbing member and releasing the scale beam to permit sudden rocking of the beam to an initial impulse position proportional to the weight of the load prior to coming to rest in a balanced position, pneumatically operated sensing means cooperating with the beam for sensing the extent of the initial impulse movement to determine the weight of the load relative to a predetermined weight, and guide means controlled by said pneumatically operated sensing means for guiding the discharged load into one path if the same is found to be within predetermined limits of a predetermined weight and for guiding the load into a second path in the event the same is found to deviate beyond predetermined limits of said predetermined weight.

11. In a machine of the character described, in combination, net weight weighing mechanism for forming successive loads of substantially uniform weight, check weighing mechanism, means for delivering successive net weighed loads to the check weighing mechanism, said check weighing mechanism including a cantilever spring weighing beam having a load receiver and mounted to move under the influence of a load delivered thereto, means for locking the cantilever beam in an inoperative position during the delivery of a load, said locking means comprising opposed upper and lower stops including a fixed upper stop and a movable lower stop, means for first moving the movable stop a relatively small distance after a preformed load has been placed thereon to permit the weighing element to move a slight distance away from the fixed stop to reduce the effects of periodic vibration and for thereafter suddenly releasing the beam to permit rapid movement of the beam to an initial impulse position proportional to the weight of the load prior to coming to rest in a balanced position, pneumatically operated sensing means cooperating with the beam for sensing the extent of the initial impulse movement to determine the weight of the load relative to a predetermined weight, and guide means controlled by said pneumatically operated means for guiding the discharged load into one path if the same is found to be within predetermined limits of a predetermined weight and for guiding the load into a second path in the event the same is found to deviate beyond predetermined limits of said normal weight.

12. In a machine of the character described, in combination, check weighing means including a weighing element movable under the influence of a preformed load placed thereon, stop means engageable with the weighing element, resilient vibration absorbing means for locking the weighing element in an inoperative position against said stop during the placing of a preformed load thereon, means for then moving said vibration absorbing means and permitting slight movement of the weighing element to remove the same from the influence of the stop and for thereafter effecting sudden release of the weighing element to permit sudden movement of the element to an initial impulse position proportional to the weight of the load prior to coming to rest in a balanced position, and means cooperating with the weighing element for sensing the extent of the initial impulse movement to determine the weight of the load relative to a predetermined weight.

13. In a machine of the character described, in combination, check weighing means including a weighing element having a load receiver and movable under the influence of a preformed load placed thereon, stop means engageable with the weighing element, resilient vibration absorbing means for locking the weighing element in an inoperative position against said stop during the placing of a preformed load thereon, means for then moving said vibration absorbing means and permitting slight movement of the weighing element to remove the same from the influence of the stop and for thereafter effecting sudden release of the weighing element to permit sudden movement of the element to an initial impulse position proportional to the weight of the load prior to coming to rest in a balanced position, means cooperating with the weighing element for sensing the extent of the initial impulse movement to determine the weight of the load relative to a predetermined weight, means for discharging the check weighed load from the receiver, and guide means responsive to said sensing means for guiding the discharged load into one path if the same is found to be within predetermined limits of a predetermined weight and for guiding the load into a second path in the event the same is found to deviate beyond predetermined limits of said predetermined weight.

14. In a machine of the character described, in combination, check weighing means including a weighing element, means for locking the weighing element including opposed upper and lower stops comprising a fixed stop and a movable stop, said locking means including means for first moving the movable stop a relatively small distance to permit the weighing element to move a slight distance away from the fixed stop to avoid the effects of periodic vibration and for thereafter suddenly releasing said weighing element to permit it to move rapidly to an initial impulse position proportional to the weight of the load, and means cooperating with the weighing element for sensing the extent of said initial impulse movement to determine the weight of the load relative to a predetermined weight.

15. In a machine of the character described, in combination, check weighing means including a cantilever spring weighing beam having a load receiver and mounted to move under the influence of a load placed thereon, means for locking the cantilever beam in an inoperative position during the placing of a preformed load thereon, said locking means comprising opposed upper and lower stops including a fixed upper stop and a movable lower stop, means for first moving the movable stop a relatively small distance after a preformed load has been placed thereon to permit the weighing element to move a slight distance away from the fixed stop to reduce the effects of periodic vibration and for thereafter suddenly releasing the beam to permit rapid movement of the beam to an initial impulse position proportional to the weight of the load, pneumatically operated means cooperating with the beam for sensing the extent of said initial impulse movement to determine the weight of the load relative to a predetermined weight, means for discharging the check weighed load from said receiver, and guide means responsive to said sensing means for guiding predetermined weight loads in one path, and for guiding into a second path those loads found to deviate from said predetermined weight.

References Cited in the file of this patent

UNITED STATES PATENTS

| Number | Name | Date |
| --- | --- | --- |
| 1,927,263 | Hebden | Sept. 13, 1933 |
| 2,050,496 | Mayo | Aug. 11, 1936 |
| 2,116,895 | Howard | May 10, 1938 |
| 2,246,597 | Niederer | June 24, 1941 |
| 2,364,902 | Howard | Dec. 12, 1944 |
| 2,488,037 | Rupley | Nov. 15, 1949 |
| 2,590,704 | Howard et al. | Mar. 25, 1952 |
| 2,628,055 | Knobel | Feb. 10, 1953 |
| 2,634,080 | Knobel | Apr. 7, 1953 |
| 2,661,091 | Maloney | Dec. 1, 1953 |
| 2,664,557 | Sargrove | Dec. 29, 1953 |
| 2,699,932 | Knobel | Jan. 18, 1955 |
| 2,712,408 | Weber | July 5, 1955 |
| 2,838,176 | Pettis | June 10, 1958 |

UNITED STATES PATENT OFFICE
CERTIFICATE OF CORRECTION

Patent No. 2,980,251            April 18, 1961

Stanley R. Howard

It is hereby certified that error appears in the above numbered patent requiring correction and that the said Letters Patent should read as corrected below.

In the grant, line 3, for "a corporation of Delaware," read -- a corporation of Massachusetts, --; column 13, line 35, for "embdied" read -- embodied --.

Signed and sealed this 21st day of November 1961.

(SEAL)
Attest:

ERNEST W. SWIDER
Attesting Officer

DAVID L. LADD
Commissioner of Patents
USCOMM-DC